(12) United States Patent  (10) Patent No.: US 8,880,421 B2
Navar et al.  (45) Date of Patent: Nov. 4, 2014

(54) SYSTEM AND METHOD FOR REWARDING CUSTOMER LOYALTY IN A MOBILE ENVIRONMENT

(75) Inventors: Murgesh Navar, San Jose, CA (US); George McMullen, Sunnyvale, CA (US)

(73) Assignee: Mobiteris, Inc., Sunnyvale, CA (US)

( * ) Notice: Subject to any disclaimer, the term of this patent is extended or adjusted under 35 U.S.C. 154(b) by 206 days.

(21) Appl. No.: 13/294,141

(22) Filed: Nov. 10, 2011

(65) Prior Publication Data

US 2012/0150606 A1   Jun. 14, 2012

Related U.S. Application Data

(60) Provisional application No. 61/412,320, filed on Nov. 10, 2010.

(51) Int. Cl.
| | | |
|---|---|---|
| *G06Q 30/00* | (2012.01) | |
| *G06Q 10/00* | (2012.01) | |
| *G06Q 30/02* | (2012.01) | |
| *H04L 29/06* | (2006.01) | |
| *G06Q 30/06* | (2012.01) | |
| *H04W 12/02* | (2009.01) | |
| *G06Q 20/02* | (2012.01) | |
| *G06Q 20/38* | (2012.01) | |
| *G06Q 20/32* | (2012.01) | |

(52) U.S. Cl.
CPC ............ *G06Q 30/06* (2013.01); *G06Q 30/0224* (2013.01); *H04L 63/107* (2013.01); *H04W 12/02* (2013.01); *G06Q 30/0226* (2013.01); *G06Q 20/027* (2013.01); *G06Q 30/0641* (2013.01); *G06Q 20/3829* (2013.01); *G06Q 20/3223* (2013.01)
USPC ...... 705/7.34; 705/7.29; 705/14.1; 705/14.25

(58) Field of Classification Search
USPC .................................................. 705/7.11–7.42
See application file for complete search history.

(56) References Cited

U.S. PATENT DOCUMENTS

| 8,099,109 | B2 * | 1/2012 | Altman et al. ............. 455/456.3 |
|---|---|---|---|
| 2008/0077488 | A1 * | 3/2008 | Main et al. ...................... 705/14 |
| 2008/0154726 | A1 * | 6/2008 | Bennett et al. .................. 705/14 |
| 2009/0061884 | A1 * | 3/2009 | Rajan et al. ................... 455/445 |
| 2009/0307091 | A1 * | 12/2009 | Lilley ......................... 705/14.58 |
| 2010/0121719 | A1 * | 5/2010 | Blair et al. ................. 705/14.64 |
| 2011/0161149 | A1 * | 6/2011 | Kaplan ...................... 705/14.17 |

* cited by examiner

*Primary Examiner* — Sujay Koneru
(74) *Attorney, Agent, or Firm* — Lewis Roca Rothgerber LLP

(57) ABSTRACT

A customer reward service may reward customers who show or are expected to show frequent patronage to a provider of a good or service. The type of reward given to a customer may depend on a variety of factors including the real-time location of the customer, registration or profile data, or other pertinent data provided by or about the customer including the customer's purchasing history or the customer's social interactions. By collecting and considering a variety of data associated with a customer, a business may provide rewards and incentives tailored to the customer thus improving the ability of the business to better attract and retain customers.

17 Claims, 10 Drawing Sheets

300

310

430

SYSTEM AND METHOD FOR REWARDING CUSTOMER LOYALTY IN A MOBILE ENVIRONMENT

CROSS-REFERENCE TO RELATED APPLICATION

This application claims the priority benefit of U.S. provisional application No. 61/412,320 filed on Nov. 10, 2010 and entitled "Systems and Methods for Secure Mobile Transactions." The disclosure of the aforementioned application is incorporated herein by reference.

BACKGROUND OF THE INVENTION

1. Field of the Invention

The present invention generally concerns customer loyalty. More particularly, the present invention relates to a customer loyalty application that allows a user in a network of users to earn rewards based on various factors such as interactions with a vendor, interactions with other users, and location.

2. Description of the Related Art

The long-term success of a business not only depends on attracting new customers but also the continual patronage of the business by existing customers. Existing methods that encourage the continued support of a business, product, or service include discount or reward cards, coupons, and promotional mailings or e-mail lists. In a discount or loyalty program, for example, a cardholder or member may earn cash or points redeemable for discounts. The discounts or rewards that are earned by a cardholder, however, are not typically tailored to the cardholder and may be based on other factors such as a merchant's needs (e.g., the need to discount certain products to maximize profits or to reduce aging inventory).

Current loyalty redemption mechanisms also rely on paper coupons or static electronic screen displays. This may make it cumbersome in a busy restaurant environment, for example, to verify the authenticity of the coupon prior to redemption. This may require a cashier to manually match the coupon code with the merchant's record of issued coupons which must then be closed out.

Current loyalty rewards methods do not exploit notable aspects of the digital age including the widespread use of mobile technologies and the constant interactions via social networks outlets and e-mail. Existing loyalty programs thus fail to consider a customer's use of mobile technologies and behaviors in the context of social networks when determining how to best reward customers. There is a need for a system and method for rewarding customer loyalty that tailors rewards based on a customer's actual behaviors, social interactions, and preferences.

SUMMARY OF THE INVENTION

A customer reward service may provide rewards to attract new customers and retain customers with proven loyalty. A user may register with the customer reward service and provide pertinent data such as registration data, demographic data, and preferences. The customer reward service may generate a user profile based on the data provided by the user as well as other parameters and/or data indicative of the user's interactions with vendors, other members of the customer reward service, and users in one or more social networking outlets. The customer reward service may match user data with specific offers provided by vendors of goods or services and select an offer tailored for the user.

In a first claimed embodiment, a method for rewarding customer loyalty is claimed. Through this method, a parameter associated with a user is received from a computing device. A user profile previously created by the user is updated based on the received parameter. The parameter is then matched with an offer for user redemption, the offer associated with a good or service offered by a vendor. The offer is then selected for presentation to the user and is transmitted to the computing device for user redemption.

In a second claimed embodiment, a system for rewarding customer loyalty is claimed. The system includes memory for storing a user parameter and a user profile and an application server. The application server updates the user profile based on a user parameter, matches the parameter with an offer, the offer for user redemption and associated with a good or service offered by a vendor, selects an offer to present to the user, and transmits the offer to the computing device for user redemption.

In a third claimed embodiment, a non-transitory computer-readable medium is claimed. The storage medium includes a computer program that is executable by a processor to perform a method for rewarding customer loyalty. The method includes receiving a parameter from a user, wherein the user is one of a plurality of users in a network, updating a user profile based on the parameter, the profile previously created by the user, matching the parameter with an offer for user redemption, the offer associated with a good or service offered by a vendor, selecting an offer to present to the user for user redemption, and transmitting the offer to the user.

DETAILED DESCRIPTION

Embodiments of the present invention may provide a service to reward customers who show or are expected to show frequent patronage to a provider of a good or service. The type of reward given to a customer may depend on a variety of factors including registration or profile data, or other pertinent data provided by the customer such as the real-time location of the customer, the customer's purchasing history, and the customer's social interactions. By collecting and considering a variety of data associated with a customer, a business may provide rewards and incentives tailored to the customer thus improving the ability of the business to better attract and retain customers.

Figure 1:
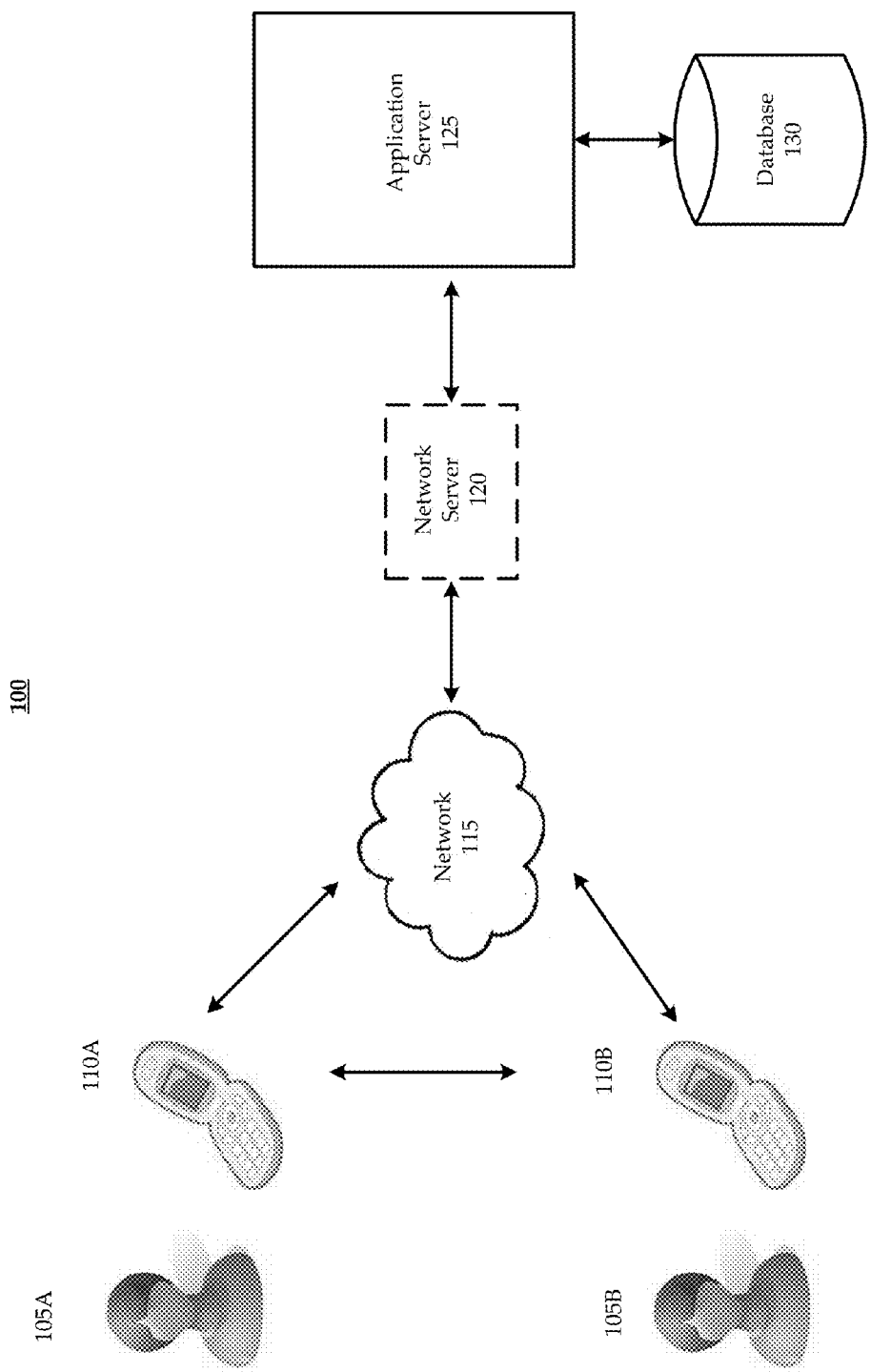
FIG. 1 illustrates a system used to reward customer loyalty.

FIG. 1 illustrates a system used to reward customer loyalty. The system 100 of FIG. 1 includes users (105A, 105B), computing devices (110A, 110B), network 115, network server 120, application server 125, and database 130.

System 100 may comprise a plurality of users (105A, 105B) and computing devices (110A, 110B) in connection with a customer reward service. Using computing device 110A, for example, user 105A may subscribe (e.g., create an account) or register with a customer reward service provided by application server 125. Once user 105A has registered with the customer reward service, user 105A may perform a login (i.e., access account) and may access the customer reward service to earn offers and rewards based on various actions or interactions. The customer reward service may be integrated with or registered with one or more social networking outlets.

When registering with the customer reward service, user 105A may be required to input or provide (via computing device 110A) registration information or user data including but not limited to name, user ID, password address, phone number, e-mail address, birthday, age, gender, relationship status, employment status, and education. User 105A may also provide other pertinent data including demographic information, geographic location, interests, hobbies, and preferences about various categories such as dining, events, travel, recreational activities, health, and retail. User registration information and data may be used to generate a profile of user 105A which may be used to tailor offers for user 105A. User data and profile information may be stored in database 130.

System 100 may include database 130 for storing data. Database 130 may store user information, profile information, preferences, parameters, and other data for use with the customer reward service provided by application server 125. Database 130 may be separate from or integrated with application server 125. Database 130 may also store any updates to user data or profile data received from/provided by user 105A.

Computing devices 110A and 110B are inclusive of a general purpose computing device capable of accessing information over a network. Computing devices 110A and 110B may be any computing device known in the art such as a workstation, laptop computer, net book computer, tablet computer, mobile device, cellular telephone, or the like that can communicate over network 115. Computing devices 110A include software and/or hardware capable of sending, receiving, and processing data such as user profile or registration data. Computing device 110A may receive data from user 105A and send the data over network 115 to application server 125 for processing. Computing devices may also offer location-based information such as that generated through cellular network base stations, IP network access, or GPS data.

Network 115 is inclusive of any communication known in the art such as the Internet, Local Area Network (LAN), Wide Area Network (WAN), intranet, extranet, private network, or other network. Application server 125 may be accessed via optional network server 120. Network server 120 may receive and process data and/or requests from computing device 110A. For example, user 105A may request and provide data to become a registered subscriber with the customer reward service provided by application server 125. Processing the data and/or request may include sending data to application server 125, receiving a response from application server 125, and sending a response or data to network server 120. Network server 120 may then forward the response or data to computing device 110A.

Application server 125 may be implemented in a general computing device that otherwise communicates with database 130 and network server 120. An example of such a device is the general computing system illustrated in FIG. 5. One or more software applications or modules may be stored in memory and executable by a processor (not shown) at application server 125. The present customer reward service may be implemented by one or more processors that execute instructions stored in one or more memory mediums. The executed instructions may result in the processor(s) generating and providing one or more graphical interfaces. FIGS. 3A-4E illustrate examples of interfaces that may be used to implement embodiments of the present invention.

Figure 2:
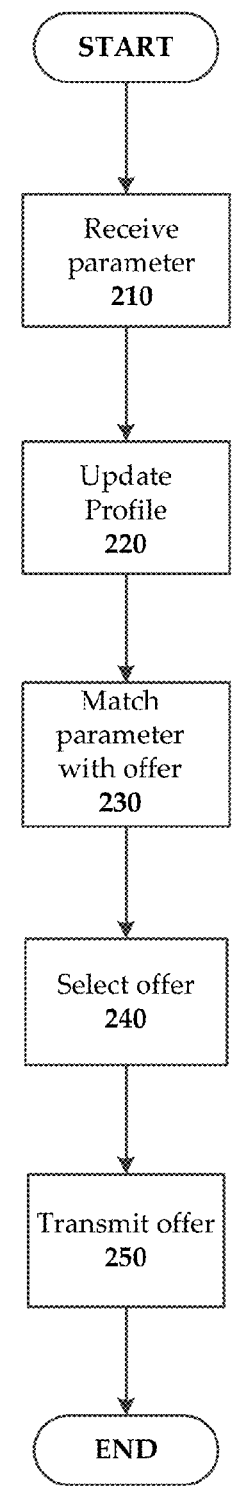
FIG. 2 illustrates a method for rewarding customer loyalty.

FIG. 2 illustrates a method for rewarding customer loyalty. The steps identified in FIG. 2 (and the order thereof) are exemplary and may include various alternatives, equivalents, or derivations thereof including but not limited to the order of execution of the same. The steps of the method of FIG. 2 (and its various alternatives) may be embodied in hardware or software including a non-transitory computer-readable storage medium (e.g., an optical disc or memory card) having instructions executable by a processor of a computing device. A user may launch or activate the method of FIG. 2 by opening or activating an application in a computing device such as a mobile device.

At step 210, a parameter is received from a computing device associated with a user. A user parameter may include any action, interaction, attribute, or characteristic associated with the user that may be considered in determining how to encourage the user to support a vendor or reward the user for supporting a vendor. A user parameter may be the real-time location of a computing device associated with the user. For example, the real-time location of a user may be at or near the venue of a local merchant or service provider. User location may be determined by any positioning technology known in the art such as global navigation satellite systems (e.g., GPS or GNSS), real-time locating systems, or local positioning systems.

A user parameter may further include any action performed by the user or any interaction between the user and a vendor. A parameter, for example, may include indicia of a purchase or transaction completed with the vendor or details about the purchase transaction such as the specific goods or services purchased, the frequency of a purchase transaction, or the purchase amount. A parameter may also include indicia of a purchase or transaction completed with a second vendor whose good or service is similar to or in competition with the good or service offered by a first vendor. A parameter may also include indicia of the redemption of a previously generated offer received by the user from a vendor.

Where a user is communicatively coupled to another user in a network via the reward program service or via a social network (e.g., Twitter®, Facebook®, or Yelp®), a parameter may include information stored in a user profile of a second user, wherein the information indicates a preference by the second user for a particular good or service or a vendor. For example, where user A and user B are connected via a social network (e.g., users A and B are "friends" or "contacts" of one another) and user B has indicated restaurant X as a "favorite," such information may be used to generate an offer for user A based on the friendship or connection between user A and user B. The system may thus leverage the friendship or real-world relationship of one person who favors a vendor, good, or service such that the friend of that person is incentivized to try the vendor, good, or service. Alternatively, one user may seek to have a second user (their friend) join them in purchasing the good or service thus resulting in increased customer traffic.

A user parameter may also include user feedback. Feedback may include any data transmitted from the computing device by the user such as a comment, criticism, rating, posting, or evaluation submitted by the user regarding a particular vendor or good or service provided by a vendor. For example, feedback may be in the form of an actual review or rating.

Feedback may also include an interaction between two users in a social network. For example, user A may post a comment to user B about a specific product, service, or vendor. Feedback may be in the form of a posting or message on a social networking site, an e-mail message, a short message service (SMS) message, or the like.

At step 220, a profile associated with the user is updated based on the received parameter. As discussed in FIG. 1, a profile may be generated based on the data provided by the user via computing device 110A when subscribing to the reward program service. Application server 125 receives parameter data from computing device 110A and may update the user profile based on the parameter data. When tailoring an offer to a customer, parameter data or other user data (e.g., registration information) stored in the user profile may be used in matching a parameter with an offer from a vendor.

At step 230, application sever 125 matches the parameter with one or more offers or offer elements (e.g., percentages off or specific goods or services subject to an offer) made available by a vendor of a good/service. Application server 125 may receive and store one or more offers or elements of an offer received from a vendor. Vendor offers may also be stored in database 130. When matching a parameter to an offer, application server 125 may perform the matching based on one or more rules such as priorities or preferences specified by the vendor. A vendor may prioritize the awarding of an offer or require the presence or absence of one or more user parameters before an offer is awarded to a user. For example, a vendor may specify that the user location be within a certain radius of the business venue and/or that the user be part of a particular demographic group (e.g., male between the ages of 30-40). As another example, a vendor may choose to award a coupon of "10% discount off entire purchase" before offering "buy-one-meal-get-one-free" coupon if it is the user's first visit to the business.

An offer may include a discount or coupon. For example, a coupon may be a general coupon that is made available to all registered users in a customer reward service. A coupon may be tailored to particular users and be offered, for example, to those users determined by application server 125 to be the highest spenders, recent customers, frequent customers, or local customers. An offer may include or be based on various elements such as a complementary product, a fixed discount on a total purchase over a specific amount, a percentage discount on total purchase over a specific amount, a percentage discount on a particular product or service, buy-on-get-one free, buy-one-get-second-one-half-off, buy-one-get-second-one-discounted-by-X-percent, or the like.

Figure 3A:
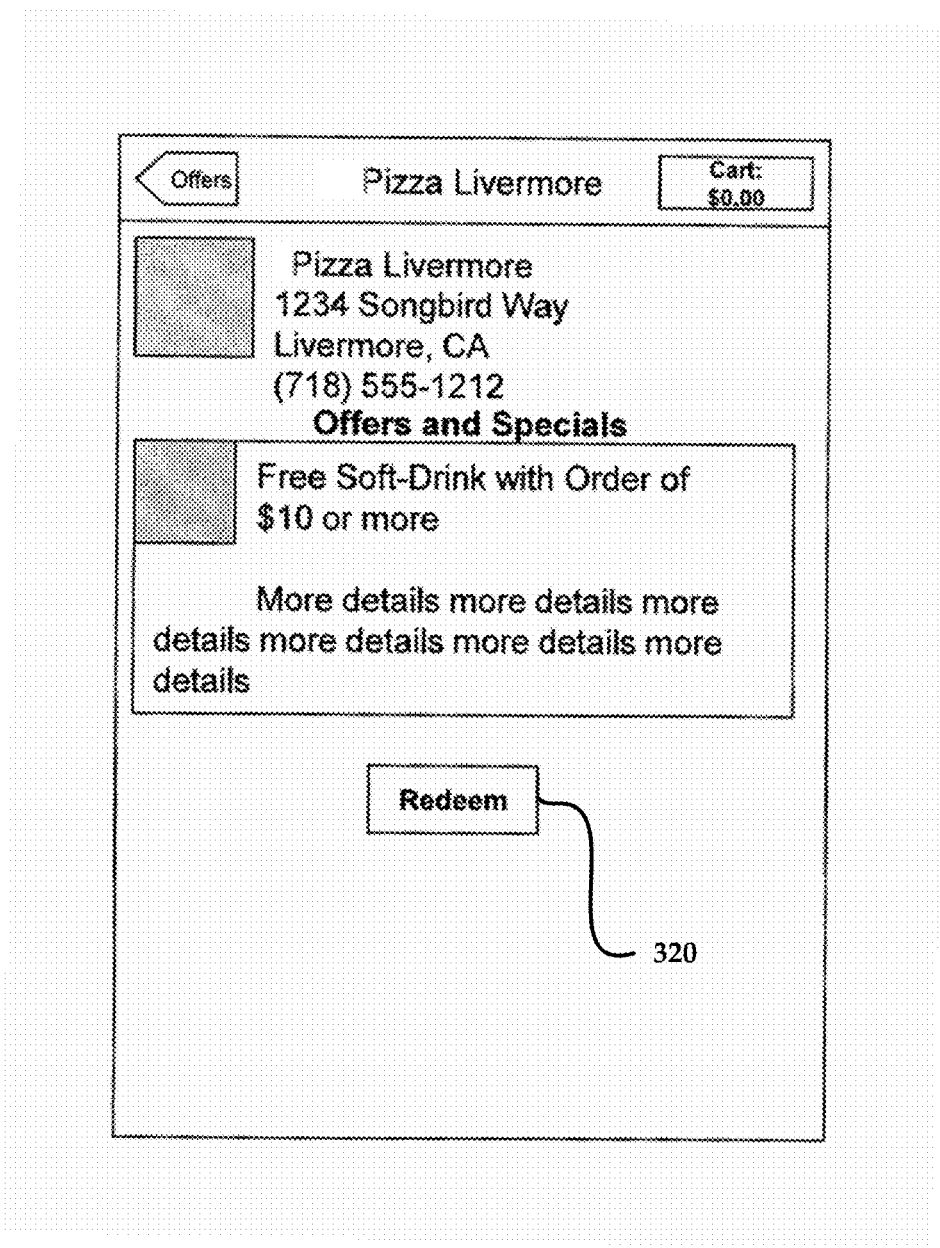
FIGS. 3A-3B illustrate exemplary interfaces for displaying a coupon offered by a vendor.
Figure 3B:
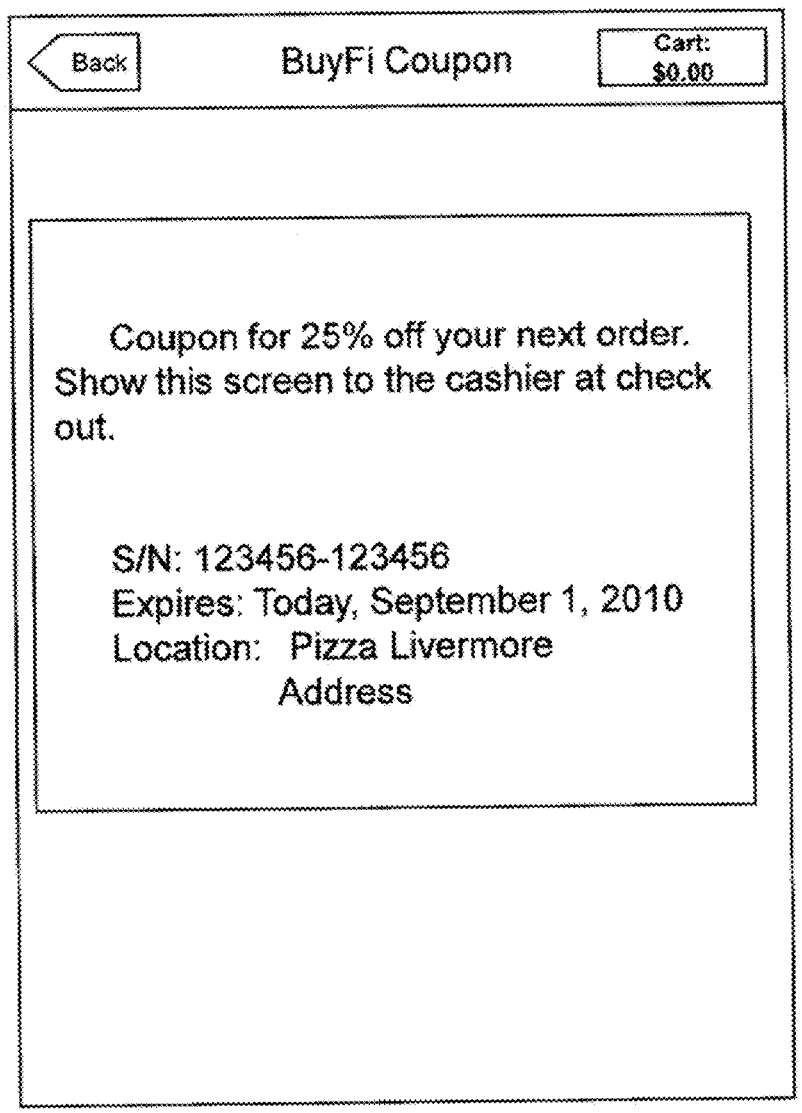

FIG. 3A illustrates an exemplary interface for displaying a coupon offered by a vendor. Interface 300 may include a redeem button 320. A user may redeem the coupon by activating the redeem button 320. Activating redeem button 320 may bring the user to another interface (not shown) which may include a unique coupon code identification number (e.g., a bar code) and in some cases a computing device identification number. The coupon may be redeemed and processed instantly or processed in-store (e.g., given to or scanned by the vendor). An offer may also be subject to a time-date range such as the coupon shown in interface 310 of FIG. 3B. A coupon may also be displayed with a countdown clock or expiration time (not shown).

Figure 4A:
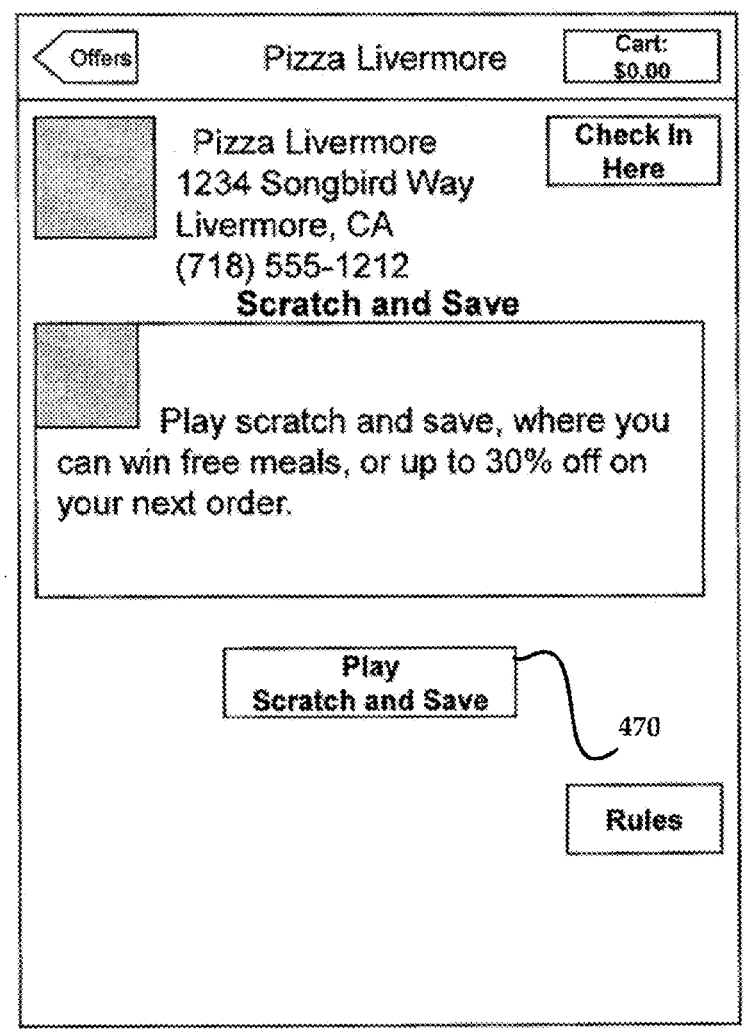
FIGS. 4A-4C illustrate exemplary interfaces for displaying a scratch card coupon offered by a vendor.
Figure 4B:
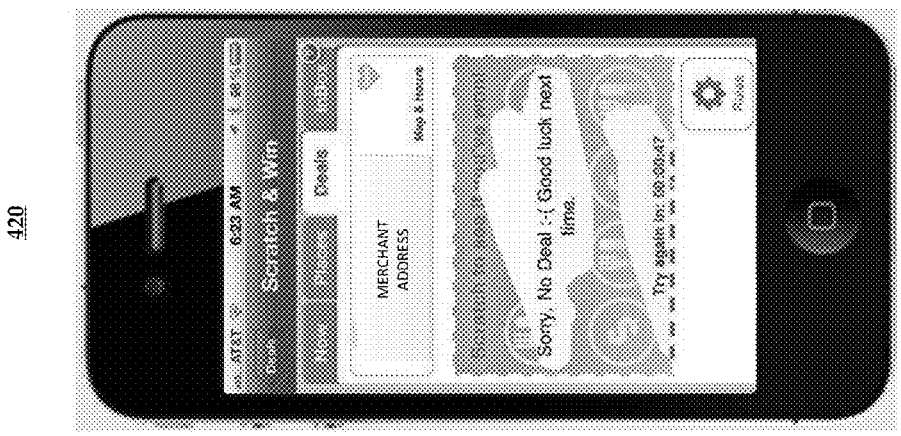
Figure 4B:
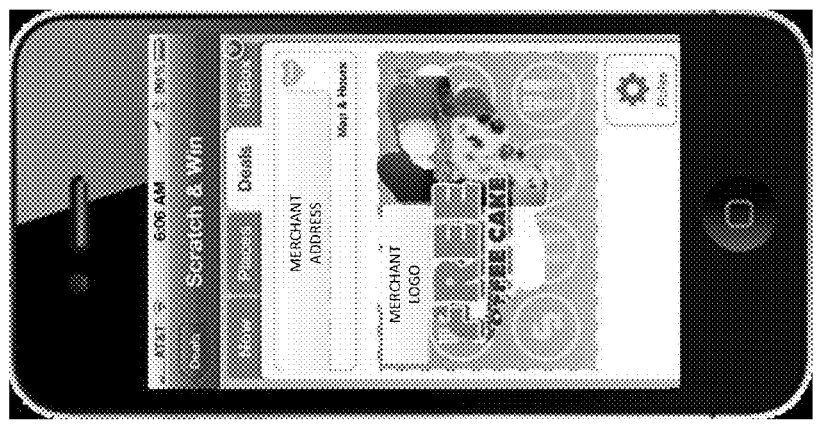
Figure 4C:
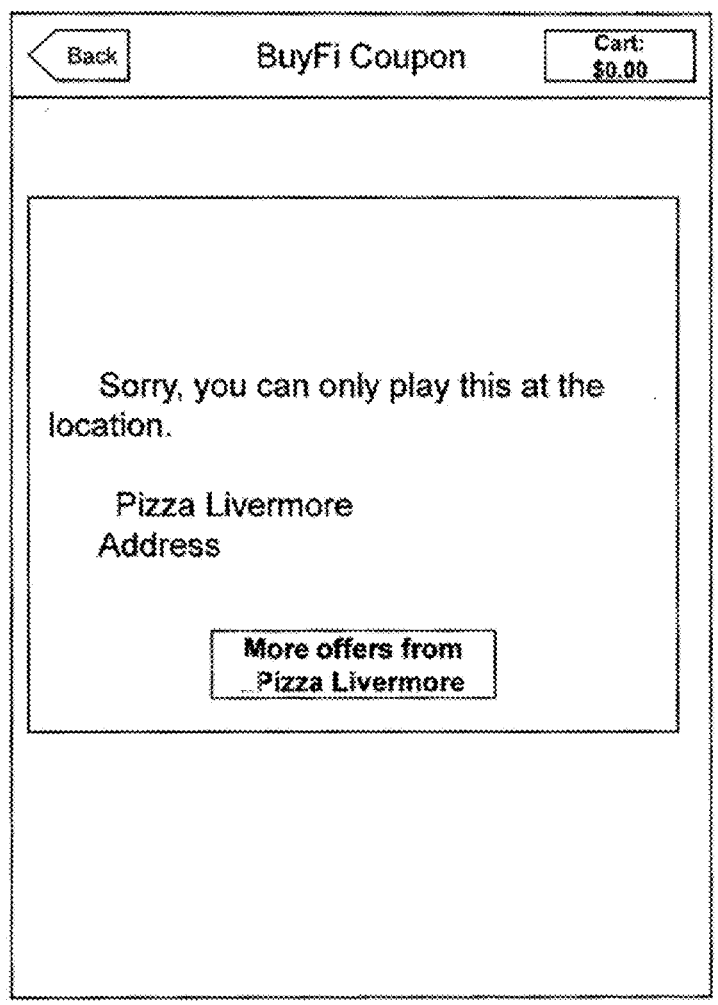

An offer may also come in the form of a scratch card or scratch type coupon that provides a user the ability to scratch and play for a chance to win the coupon. FIG. 4A illustrates an exemplary interface for displaying a scratch card coupon offered by a vendor. A user may play the scratch card by activating a play button 470. FIG. 4B illustrates exemplary interfaces 410-420 for displaying a scratch card following user activation of the play button 470. Interface 410 illustrates a scratch card where the user has won a coupon while interface 420 illustrates a non-winning scratch card. The probability of winning a coupon may be determined by an automated heuristic and may depend on a number of factors including the distance of user 105A from the vendor, the proven loyalty of 105A to the vendor (e.g., number of completed transactions with the vendor), an indicated preference by the user for the vendor or good or service provided by the vendor, or whether user 105A has referred or recommended other customers to the vendor.

A scratch card may be "in-store only" where the scratch coupon may only be played and/or scratched while at or near the business venue. Application server 125 may receive location information from computing device 110A and compare that information with location information of the business venue. Application server 125 may transmit the scratch coupon to the computing device 110A once the user location is verified. If user location cannot be verified, application server 125 may transmit an error message for display on computing device 110A such as "Sorry, you can only play this at the location" as shown in interface 430 of FIG. 4C.

An offer may also come in the form of a points which may be redeemable for prizes including cash, discounts, or complementary products or services with a particular vendor or while attending a specific event. User 105A may earn or accumulate points for various actions or interactions and may compare points (e.g., ranking) amongst other users in the customer rewards service. User 105A may accumulate points, for example, when "checking in" into a particular event (e.g., concert, sporting event, etc.) or location, when other users in the network (e.g., friends) check in to the same location, or when users check in to a specific location together.

After the user parameter is matched with elements of or a specification vendor offer in step 230, application server 125 may select an offer to present to the user for user redemption at step 240. The offer may be generated in real-time from various offer elements (e.g., a certain percentage off a particular product) or may be selected from a series of available offers by the vendor. The offer may thus be created on the fly from real-time data to be as timely and relevant as possible or may be selected from a pool of offers that have previously been generated and approved by the vendor. The vendor, for example, may offer a complementary product (i.e., one free class of orange juice), a fixed discount on a total purchase over a specific amount (i.e., $5 off a purchase of $20 or more), a percentage discount on total purchase over a specific amount (i.e., 10% off a purchase of $20 or more), a percentage discount on a particular product or service, or the like. In the case of real-time offers, the vendor may implement certain limitations or controls such as limiting the maximum percentage off any given product, prohibiting discounts on certain products, or requiring that a user have a specific profile to be given access to certain offers. At step 250, application server 125 transmits the offer to computing device 110A for user redemption.

Figure 4D:
FIG. 4D illustrates exemplary interfaces for scratch card redemption.

After receiving a transmitted offer at step 250, a user may redeem the offer with the merchant. FIG. 4D illustrates exemplary interfaces 440-450 for scratch card redemption. After receiving a winning scratch card, the user may redeem the offer by showing the winning scratch to the merchant as shown in interface 440. The user may be prompted to confirm the redemption as shown in interface 450. In some cases, a coupon may only be used once (as shown in interface 450) or may be used multiple times as specified by the merchant.

Figure 4E:
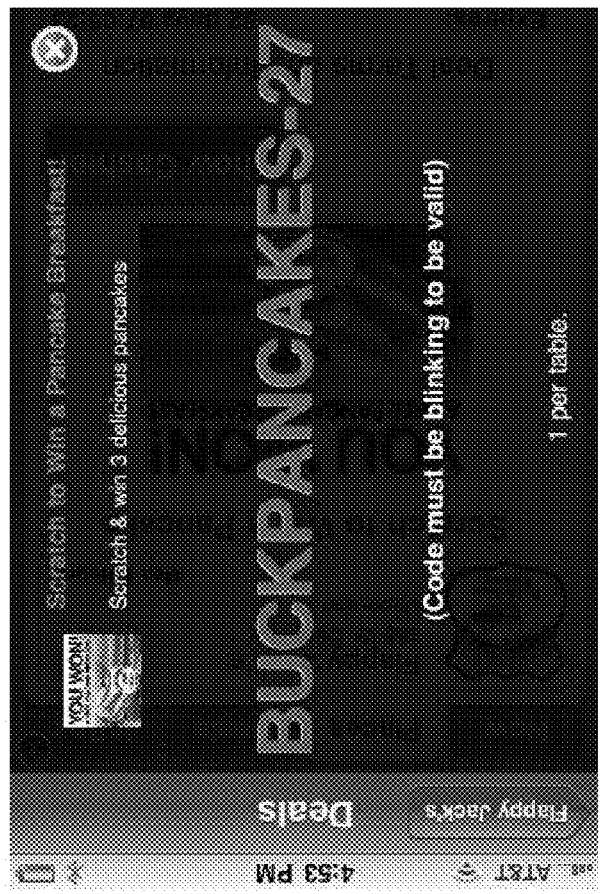
FIG. 4E shows an exemplary interface displaying a coupon or offer code for merchant verification during user redemption.

FIG. 4E shows an exemplary interface 460 displaying a coupon or offer code for merchant verification during user redemption. A coupon or offer code may be uniquely identifiable (e.g., may appear to be blinking, highlighted, colored, or the like) to the user and merchant. A uniquely identifiable coupon code (i.e., a blinking coupon) may help to ensure that the user is not using a static image saved on the computing device. In other words, where a merchant has designated an offer for one-time use, a blinking or moving, unfixed image may help prevent the unauthorized reuse of the offer. A coupon or offer code may include letters, numbers, symbols, or a combination of the same and may be associated with an expiration date and/or time. Once redeemed, the coupon may be automatically deleted and inaccessible from the computing device of the user. The validity of the coupon or offer may be managed and tracked by application server 125. The redemption of the merchant offer via the computing device is convenient for the user and merchant and the merchant may be able to easily verify the validity of the coupon.

Application server 125 may generate a notification concerning a sale, special event, membership, or other promotion hosted or sponsored by the vendor. When providing profile data, for example, user 105A may indicate preferences or "favorites." User 105A may indicate a particular business, product, or type of activity as a "favorite." A vendor may choose to send user 105A a notification when a parameter or profile data matches an offer offered by the vendor (e.g., where the goods or services of the vendor may match the interests, preferences, or favorites of the user). Alternatively, a vendor may choose to send a notification to all users in the network regardless of whether there is a match. Application server 125 may transmit the notification to user 105A at computing device 110A using any method known in the art such as via Short message service (SMS) message, e-mail message, or the like.

Application server 125 may track a generated offer received by user 105A. Application server 125 may track, for example, the type of offer awarded, the number of times a particular offer has been viewed by users, the number of times a particular offer has been awarded, the number of times a scratch card has been played, the average distance between the merchant location and where a scratch card has been played, whether an offer received by user 105A has been redeemed by user 105A, and/or whether user 105A has shared or recommended the offer to other users in the network. Tracking information for a coupon or offer may be generated by application server 125 and displayed to a merchant via a graphical interface. A coupon, discount, or scratch card, or other promotion may be shared amongst users in the rewards program service or via a social networking website. An offer may be shared using any medium such as via a link, by copying the coupon code identification number, via SMS message, via e-mail message, or the like.

Figure 5:
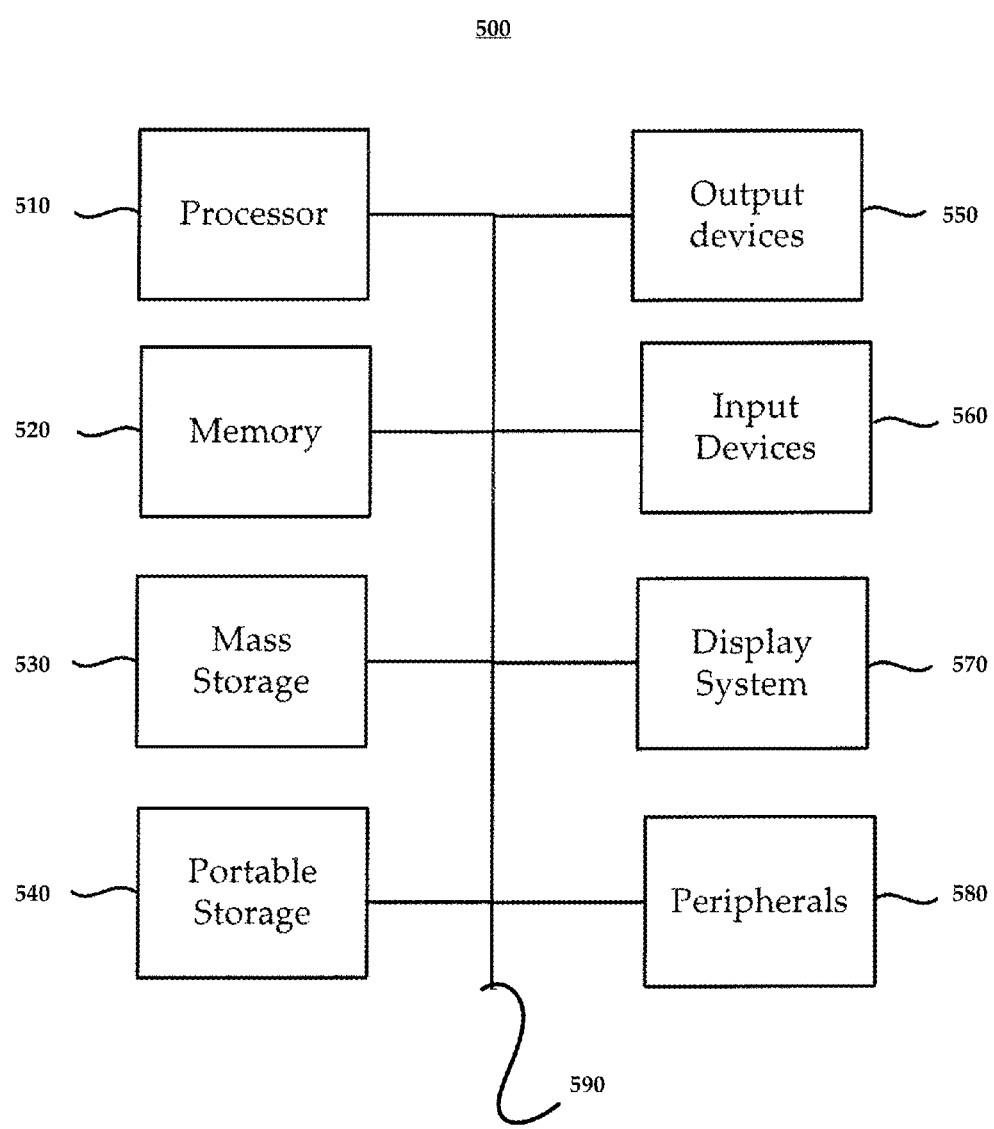
FIG. 5 illustrates a computing system that may be used to implement an embodiment of the present invention.

FIG. 5 illustrates a computing system 500 that may be used to implement the present technology. System 500 of FIG. 5 may be used to implement computing device 110A and 110B, network server 120, application server 125, and database 130 in the context of the system of FIG. 1. The computing system 500 of FIG. 5 includes one or more processors 510 and memory 520. Main memory 520 stores, in part, instructions and data for execution by processor 510. Main memory 520 can store the executable code when in operation. Main memory 520 may also include a database such as database 130 illustrated in FIG. 1. The system 500 of FIG. 5 further includes a mass storage device 530, portable storage medium drive(s) 540, output devices 550, user input devices 560, a graphics display 570, and peripheral devices 580.

The components shown in FIG. 5 are depicted as being connected via a single bus 590. The components, however, may be connected through one or more data transport means. For example, processor unit 510 and main memory 520 may be connected via a local microprocessor bus, and the mass storage device 530, peripheral device(s) 580, portable storage device 540, and display system 570 may be connected via one or more input/output (I/O) buses.

Mass storage device 530, which may be implemented with a magnetic disk drive or an optical disk drive, is a non-volatile storage device for storing data and instructions for use by processor unit 510. Mass storage device 530 may store the system software for implementing embodiments of the present invention for purposes of loading software into main memory 520.

Portable storage device 540 operates in conjunction with a portable nonvolatile storage medium, such as a floppy disk, compact disk or Digital video disc, to input and output data and code to and from the computer system 500 of FIG. 5. The system software for implementing embodiments of the present invention may be stored on such a portable medium and input to the computer system 500 via the portable storage device 540.

Input devices 560 provide a portion of a user interface. Input devices 560 may include an alpha-numeric keypad, such as a keyboard, for inputting alpha-numeric and other information, or a pointing device, such as a mouse, a trackball, stylus, or cursor direction keys. Additionally, the system 500 as shown in FIG. 5 includes output devices 550. Examples of suitable output devices include speakers, printers, network interfaces, and monitors.

Display system 570 may include a liquid crystal display (LCD) or other suitable display device. Display system 570 may receive textual and graphical information, and process the information for output to the display device.

Peripherals 580 may include any type of computer support device to add additional functionality to the computer system. For example, peripheral device(s) 580 may include a modem or a router.

The components contained in the computing system 500 of FIG. 5 are those typically found in computer systems that may be suitable for use with embodiments of the present invention and are intended to represent a broad category of such computer components that are well known in the art. Thus, the computing system 500 of FIG. 5 may be a personal computer, hand held computing device, telephone, mobile computing device, workstation, server, minicomputer, mainframe computer, or any other computing device. The computer may also include different bus configurations, networked platforms, multi-processor platforms, etc. Various operating systems may be used including Unix, Linux, Windows Mobile, or iOS. The steps of the method of FIG. 2 (and its various alternatives) may be performed by a module or engine stored on a computer readable storage medium (e.g., optical disc, memory card, etc.) comprising instructions executable by a processor of a computing device.

The above description is illustrative and not restrictive. Many variations of the invention will become apparent to those of skill in the art upon review of this disclosure. While the present invention has been described in connection with a variety of embodiments, these descriptions are not intended to limit the scope of the invention to the particular forms set forth herein. To the contrary, the present descriptions are intended to cover alternatives, modifications, and equivalents as may be included within the spirit and scope of the invention as defined by the appended claims and otherwise appreciated by one of ordinary skill in the art.

What is claimed is:

1. A method for rewarding customer loyalty with dynamically adjustable electronic scratch cards, comprising:
   receiving a plurality of parameters from a computing device associated with a user, wherein the plurality of parameters include:
      user location data representing the geographic distance from the user to a vendor in real-time,
      user purchase history data representing the number of times the user has completed a previous transaction with the vendor, and
      user review history data representing the number of times the user has positively reviewed the vendor in a social network; and
   executing instructions stored in memory, wherein execution of the instructions by a processor:
      updates a user profile based on the plurality of parameters, the profile previously created by the user and stored in memory,
      matches the plurality of parameters stored in the user profile with a plurality of scratch cards playable by the user and associated with a good or service offered by the vendor, each of the scratch cards further associated with a dynamically adjustable probability that the scratch card will present winning results when played by the user, selects a scratch card from the plurality of scratch cards to present to the user,
      dynamically adjusts the probability that the selected scratch card will present winning results when played by the user based on the plurality of parameters stored in the user profile, and
      transmits the selected scratch card to the computing device, the selected scratch card displayable on a graphical interface of the computing device, the selected scratch card including an activation button that allows the user to play the scratch card.

2. The method of claim 1, wherein the scratch card is generated in real-time.

3. The method of claim 1, wherein the scratch card is selected from a series of available scratch cards from the vendor.

4. The method of claim 1, wherein the plurality of parameters further include information stored in a user profile of a second user in the network, the user being communicatively coupled to the second user, and wherein the information indicates a preference by the second user for a good or service offered by the vendor.

5. The method of claim 1, wherein the plurality of parameters further include indicia of redemption of an offer received by the user.

6. The method of claim 1, wherein the plurality of parameters further include indicia of a purchase or transaction previously completed with a second vendor offering a good or service similar to the good or service offered by the vendor.

7. The method of claim 1, wherein the plurality of parameters further include user feedback about the vendor.

8. The method of claim 1, wherein the plurality of parameters further include user feedback about the good or service offered by the vendor.

9. The method of claim 1, wherein the scratch card is based on information stored in the user profile, the information indicating a preference by the user for the vendor.

10. The method of claim 1, wherein the scratch card is based on information stored in the user profile, the information indicating a preference by the user for the good or service offered by vendor.

11. The method of claim 1, wherein the execution of instructions by the processor further tracks the scratch card received by the user.

12. The method of claim 1, wherein the execution of instructions by the processor further generates a notification regarding a special event or sale hosted by the vendor and transmits the notification to the computing device.

13. The method of claim 1, further comprising sending the scratch card to a second user in the network.

14. A system for rewarding customer loyalty with dynamic electronic scratch cards, comprising:
   memory that stores a user profile associated with a user and a plurality of user parameters received from a computing device associated with a user, wherein the plurality of parameters include:
      user location data representing the geographic distance from the user to a vendor in real-time,
      user purchase history data representing the number of times the user has completed a previous transaction with the vendor, and
      user review history data representing the number of times the user has positively reviewed the vendor in a social network; and
   an application server that:
      updates the user profile based on the plurality of parameters, the profile previously created by the user and stored in memory,
      matches the plurality of parameters stored in the user profile with a plurality of scratch cards playable by the user and associated with a good or service offered by a vendor, each of the scratch cards further associated with an adjustable probability that the scratch card will present winning results when played by the user,
      selects a scratch card from the plurality of scratch cards to present to the user,
      dynamically adjusts the probability that the selected scratch card will present winning results when played by the user based on the plurality of parameters stored in the user profile, and
      transmits the selected scratch card to the computing device.

15. A non-transitory computer-readable storage medium having embodied there on a program, the program being executable by a processor to perform a method for rewarding customer loyalty with dynamic electronic scratch cards, the method comprising:
   receiving a plurality of parameters from a computing device associated with a user, wherein the plurality of parameters include:
      user location data representing the geographic distance from the user to a vendor in real-time,
      user purchase history data representing the number of times the user has completed a previous transaction with the vendor, and
      user review history data representing the number of times the user has positively reviewed the vendor in a social network;
   updating a user profile based on the plurality of parameters, the profile previously created by the user and stored in memory;
   matching the plurality of parameters stored in the user profile with a plurality of scratch cards playable by the user and associated with a good or service offered by the vendor, each of the scratch cards further associated with a dynamically adjustable probability that the scratch card will present winning results when played by the user;

selecting a scratch card from the plurality of scratch cards to present to the user;

dynamically adjusting the probability that the selected scratch card will present winning results when played by the user based on the plurality of parameters stored in the user profile; and transmitting the selected scratch card to the computing device, the selected scratch card displayable on a graphical interface of the computing device, the selected scratch card including an activation button that allows the user to play the scratch card.

16. A method for rewarding customer loyalty with dynamically adjustable electronic scratch cards, comprising:

receiving one or more parameters from a computing device associated with a user, wherein the one or more parameters includes user location data representing the geographic distance from the user to a vendor in real-time and one or more of:

user purchase history data representing the number of times the user has completed a previous transaction with the vendor, and user review history data representing the number of times the user has positively reviewed the vendor in a social network; and executing instructions stored in memory, wherein execution of the instructions by a processor:

updates a user profile based on the one or more parameters, the profile previously created by the user and stored in memory, matches the one or more parameters stored in the user profile with a plurality of scratch cards playable by the user and associated with a good or service offered by the vendor, each of the scratch cards further associated with a dynamically adjustable probability that the scratch card will present winning results when played by the user, selects a scratch card from the plurality of scratch cards to present to the user, dynamically adjusts the probability that the selected scratch card will present winning results when played by the user based on the one or more parameters stored in the user profile, transmits the selected scratch card to the computing device, the selected scratch card displayable on a graphical interface of the computing device but initially locked from being played by the user, verifies that the user is within a predetermined radius of the vendor based on the user location data, transmits a signal to the computing device to unlock the selected scratch card when the verification step indicates that the user is within the predetermined radius of the vendor, and transmits an error message to the computing device when the verification step indicates that the user is not within the predetermined radius of the vendor.

17. A system for rewarding customer loyalty with dynamic electronic scratch cards, comprising:

memory that stores a user profile associated with a user and a plurality of user parameters received from a computing device associated with a user, wherein the plurality of parameters include user location data representing the geographic distance from the user to a vendor in real-time and at least one of the following parameters:

user purchase history data representing the number of times the user has completed a previous transaction with the vendor, and user review history data representing the number of times the user has positively reviewed the vendor in a social network; and an application server that:

updates the user profile based on the plurality of parameters, the profile previously created by the user and stored in memory, matches the plurality of parameters stored in the user profile with a plurality of scratch cards playable by the user and associated with a good or service offered by a vendor, each of the scratch cards further associated with an adjustable probability that the scratch card will present winning results when played by the user, selects a scratch card from the plurality of scratch cards to present to the user, dynamically adjusts the probability that the selected scratch card will present winning results when played by the user based on the plurality of parameters stored in the user profile, and transmits the selected scratch card to the computing device.

\* \* \* \* \*